United States Patent Office 3,827,999
Patented Aug. 6, 1974

3,827,999
STABLE ELASTOMERIC POLYMER-OIL COMPOSITIONS
Ronald K. Crossland, Manhattan Beach, Calif., assignor to Shell Oil Company
No Drawing. Filed Nov. 9, 1973, Ser. No. 414,489
Int. Cl. C08c 11/22
U.S. Cl. 260—33.6 AQ                5 Claims

ABSTRACT OF THE DISCLOSURE

Stable polymer-oil compositions which have elastic properties and are suitable for casting or other application comprise 2–30% of a selectively hydrogenated block copolymer and 70–98% of an essentially non-aromatic hydrocarbon oil having a boiling point in excess of the melting point of the composition.

BACKGROUND OF THE INVENTION

The present invention relates to new and useful elastomeric polymer-oil compositions comprising certain selectively hydrogenated block copolymers and certain non-aromatic hydrocarbon oils.

The art relative to block copolymers and their uses has grown rapidly in recent years. The extension of block polymers with oils and other components such as resins, fillers, processing aids and compatible thermoplastic polymers is known in considerable diversity. The hydrogenation of such copolymers also has been disclosed as in U.S. 3,595,942. Compositions showing extending oils include U.S. Pat. No. 3,239,478. The preparation of typical block polymers is disclosed in U.S. Pat. No. 3,265,765.

The preparation of stable elasatomeric polymer-oil compositions which may be applied as melts is suggested in U.S. Pat. No. 3,676,387. However, this latter patent is clearly restricted in its disclosure and results to the use of non-hydrogenated polymers typified by polystyrene-polybutadiene-polystyrene, or polystyrene-polyisoprene-polystyrene. When these non-hydrogenated polymers are combined with suitable paraffinic oils, it was noted that gels having interesting elastomeric properties were produced at room temperatures. Due to the high oil extension of these compositions, it was possible to soften or melt them so that they could be extruded, molded, cast or otherwise shaped and later cooled to regain the basic elastomeric properties desired.

Even though such compositions are probably of some utility, they nonetheless require substantial proportions of the block copolymer to achieve the desired combination of hot flow and cold elastomeric properties. Since the polymers involved are relatively costly components it would be a substantial advance in the art if a particular kind of block copolymer could be combined with oils at high dilution, the amount of copolymer required for obtaining a given set of physical properties being substantially less than those disclosed and suggested by U.S. Pat. No. 3,676,387.

OBJECT OF THE INVENTION

It is an object of the present invention to provide novel block copolymer-oil compositions. It is a particular object of the invention to provide such compositions having great oil extendability. It is a further object of the invention to provide compositions of this character which have enhanced thermal stability. Other objects will become apparent during the following detailed description of the invention.

STATEMENT OF THE INVENTION

Now, in accordance with the present invention, compositions are provided which can be softened or melted at elevated temperatures but which regain elastomeric properties at ambient temperatures and comprise 2–30% wt. of certain selectively hydrogenated block copolymers as fully disclosed below and 70–98% wt. of an essentially non-aromatic hydrocarbon oil having a minimum boiling point in excess of the softening point of the compositions.

It has been found that the use of the selectively hydrogenated block copolymer in combination with the class of hydrocarbon oils discussed hereinafter is unexpectedly efficient in that the amount of polymer required to give a gel structure at ambient temperatures is substantially lower than that required when non-hydrogenated precursors of such polymers are employed to obtain a composition of similar properties.

The block copolymers of the present invention may be either linear or branched in their molecular configurations. The end blocks, which preferably are monoalkenylarene polymer blocks, such as polystyrene or polyalphamethylstyrene, are formed by solution polymerization utilizing lithium based intitiators to form a living polymer block which is then block polymerized with a conjugated diene such as butadiene or isoprene or a mixture thereof. The living block copolymer thus formed may then be reacted with a second portion of the monoalkenylarene to form a second terminal block or may be coupled to form linear or branched block copolymers. The block copolymers contemplated here have at least two monoalkenylarene polymer blocks and at least one hydrogenated polymer block of a conjugated diene. Coupling agents may be either di-functional or polyfunctional, as desired. The block molecular weights desired may be obtained by varying the monomer/initiator ratio. The block molecular weights given hereinafter may be determined by gel permeation chromatography methods. Following the polymerization stages and coupling, if any, the products are subjected to selective hydrogenation such that at least about 90% (preferably at least 98%) of the aliphatic double bonds in the diene block are reduced while no more than about 20% (preferably no more than 5%) of the aromatic double bonds in the end blocks are reduced and are referred to here as having substantially completely hydrogenated diene polymer blocks. Particularly preferred species of such selectively hydrogenated polymers are those in which the end blocks are polystyrene. The block copolymers can be selectively hydrogenated by the processes such as those disclosed in U.S. 3,595,942. Thus, specifically preferred polymers are the following:

polystyrene-hydrogenated polyisoprene-polystyrene
polystyrene-hydrogenated polybutadiene-polystyrene.

It will be understood that the block copolymer may comprise more complicated structures of either linear or branched configurations and may contain any desired number of polymer blocks as long as each of them has the identity and block molecular weights considered here. The block molecular weights employed for the present purpose are 5,000–75,000 average molecular weight in the monoalkylarene polymer blocks (preferably 8,000–65,000) and 25,000–250,000 average molecular weight for the hydrogenated blocks of conjugated dienes (preferably 35,000–110,000).

The non-aromatic hydrocarbon oils useful for the preparation of the compositions of this invention are as follows:

EXTENDING OILS

| Grade | Naphthenic | | | | | | Paraffinic | | | |
|---|---|---|---|---|---|---|---|---|---|---|
| | A | B | C | D | E | F | G | H | I | J |
| Viscosity, SUS at 100° F | 59 | 95 | 180 | 580 | 880 | 1,850 | 85 | 165 | 495 | 1,912 |
| Viscosity, SUS at 210° F | 34 | 38 | 42 | 55 | 63 | 90 | 38 | 44 | 64 | 130 |
| Gravity, °API | 28.8 | 26.9 | 25.3 | 23.0 | 22.7 | 22.1 | 34.5 | 33.0 | 30.9 | 28.8 |
| Specific gravity, 60/60 | 0.8827 | 0.8933 | 0.9024 | 0.9159 | 0.9177 | 0.9212 | 0.8524 | 0.8602 | 0.8713 | 0.8826 |
| Pounds/gallon | 7.36 | 7.45 | 7.52 | 7.64 | 7.65 | 7.68 | 7.10 | 7.17 | 7.27 | 7.35 |
| Color, Saybolt D-156 | +30 | +30 | +30 | +30 | +25 | +25 | +30 | +30 | +30 | +25 |
| Flash COC, ° F | 295 | 315 | 340 | 400 | 425 | 465 | 360 | 385 | 475 | 565 |
| Pour Point, ° F | −60 | −55 | −30 | −5 | 0 | 5 | 5 | 15 | 15 | 25 |
| Acid number | 0.00 | 0.00 | 0.00 | 0.00 | 0.00 | 0.00 | 0.00 | 0.00 | 0.00 | 0.00 |
| Percent sulfur | L0.001 | L0.001 | L0.001 | L0.001 | L0.001 | L0.002 | L0.001 | L0.001 | L0.001 | L0.001 |
| Aniline point, ° F | 180 | 191 | 197 | 204 | 210 | 221 | 222 | 233 | 254 | 276 |
| Refractive index at 20° C | 1.4777 | 1.4834 | 1.4884 | 1.4951 | 1.4960 | 1.4978 | 1.4661 | 1.4709 | 1.4760 | 1.4835 |
| Refractivity intercept | 1.038 | 1.039 | 1.039 | 1.039 | 1.039 | 1.039 | 1.044 | 1.044 | 1.044 | 1.044 |
| Viscosity-gravity constant | 0.852 | 0.855 | 0.855 | 0.856 | 0.854 | 0.851 | 0.800 | 0.800 | 0.791 | 0.793 |
| Distillation, ° F., D-1160: | | | | | | | | | | |
| IBP | 540 | 535 | 550 | 623 | 610 | 630 | 561 | 575 | 664 | 760 |
| 5% | 561 | 545 | 600 | 699 | 722 | 729 | 670 | 690 | 789 | 891 |
| 10% | 575 | 595 | 680 | 718 | 780 | 795 | 692 | 763 | 820 | 920 |
| 50% | 617 | 663 | 720 | 779 | 821 | 896 | 740 | 810 | 924 | 1,050+ |
| 95% | 683 | 762 | 780 | 850 | 870 | 1,018 | 794 | 887 | 1,013 | |
| Volatility, 22 hrs/225° F., wt. percent | | 12.0 | 8.0 | 1.0 | 0.8 | 0.5 | 2.0 | 1.0 | 0.3 | 0.05 |
| UV absorptivity at 260 mμ | 0.002 | 0.002 | 0.005 | 0.020 | 0.025 | 0.104 | 0.005 | 0.004 | 0.004 | 0.028 |
| Clay-gel analysis, wt. percent: | | | | | | | | | | |
| Asphaltenes | 0.0 | 0.0 | 0.0 | 0.0 | 0.0 | 0.0 | 0.0 | 0.0 | 0.0 | 0.0 |
| Polar compounds | 0.0 | 0.0 | 0.0 | 0.0 | 0.0 | 0.0 | 0.0 | 0.0 | 0.0 | 0.0 |
| Aromatics | 0.1 | 0.1 | 0.6 | 8.0 | 8.0 | 8.1 | 0.0 | 0.0 | 0.9 | 3.3 |
| Saturates | 99.9 | 99.9 | 99.4 | 92.0 | 92.0 | 91.9 | 100.0 | 100.0 | 99.1 | 96.7 |
| Carbon type analysis, percent: | | | | | | | | | | |
| Aromatic carbons | 0 | 0 | 0 | 0 | 0 | 0 | 0 | 0 | 0 | 0 |
| Naphthenic carbons | 56 | 57 | 57 | 57 | 57 | 56 | 31 | 31 | 31 | 32 |
| Paraffinic carbons | 44 | 43 | 43 | 43 | 43 | 44 | 69 | 69 | 69 | 68 |

The oils typified by those described above may contain up to about 10% aromatic hydrocarbons by Clay-Gel Analysis, although, by carbon-type analysis aromatic carbons are essentially absent.

The compositions are preferably prepared by subjecting mixtures of the hydrogenated block copolymer and at least a portion of the hydrocarbon oil to mixing conditions at temperatures (50–250° C.) suitable for expediting dispersion of the block copolymer in the oil. Although it is undesirable economically if it can be avoided, solution methods may be employed, namely, dispersion of the block copolymer in a relatively volatile solvent such as cyclohexane, addition of the non-aromatic oil to the solution and evaporation of the volatile solvent. Other components generally employed in the art of compounding may be incorporated at any suitable stage as desired. These include waxes, resins, fillers and antioxidants, for example.

The invention is illustrated by the following examples wherein all parts are given as "phr.", referring to parts by weight per hundred parts of block copolymer.

EXAMPLE I

A comparison is made between compositions comprising a non-hydrogenated block copolymer and its selectively hydrogenated counterpart, both dispersed in a pharmaceutical grade mineral white oil. The table below indicates the effect of each of these polymers with respect to tensile strength, elongation and bleeding tendencies. The non-hydrogenated polymer (polymer A) has the structure polystyrene - polybutadiene-polystyrene, while selectively hydrogenated polymer has the structure polystyrene—substantially completely hydrogenated polybutadiene-polystyrene. The block molecular weights in each case are about 9,500–48,000–9,500.

| | Non-hydrogenated polymer | | | Hydrogenated polymer | | |
|---|---|---|---|---|---|---|
| Oil | $T_B$ (p.s.i.) | $E_B$ (percent) | Bleeding | $T_B$ (p.s.i.) | $E_B$ (percent) | Bleeding |
| 300 | 11 | 370 | Slight | 75 | 750 | Nil. |
| 400 | 5 | 300 | do | 35 | 700 | Slight. |
| 500 | 6 | 320 | Mod | 16 | 430 | Do. |
| 750 | 4 | 300 | Heavy | 5 | 260 | Do. |
| 1,000 | 3 | 280 | do | 3 | 250 | Do. |

From the above data, it can be seen that the tensile strength of the compositions gelled with the hydrogenated polymer are substantially higher than the compositions containing the non-hydrogenated counterpart. The same is true of the elongation of these samples. These results are especially unexpected in view of the observations given in the Table relative to bleeding, wherein it is noted that the compositions containing the hydrogenated polymer show no more than slight indications of bleeding as compared with the heavy bleeding which occurs with the compositions containing the non-hydrogenated block polymer.

EXAMPLE II

The same oil as used in Example I can be employed in forming the compositions described in the following table. The non-hydogenated polymer has the structure polystyrene-polyisoprene-polystyrene, the block molecular weights being 10,000–50,000–10,000. The hydrogenated polymer prepared therefrom is essentially completely saturated in the aliphatic block. The relatively greater effectiveness of the latter polymer in imparting useful properties to the dispersions is noteworthy.

| | Non-hydrogenated polymer | | | Hydrogenated polymer | | |
|---|---|---|---|---|---|---|
| Oil | $T_B$ (p.s.i.) | $E_B$ (percent) | Viscosity | $T_B$ (p.s.i.) | $T_B$ (percent) | Viscosity |
| 300 | 12 | 400 | 400 | 80 | 850 | 1200 |
| 400 | 5 | 350 | 170 | 30 | 800 | 400 |
| 500 | 3 | 370 | 120 | 15 | 500 | 180 |
| 750 | 2 | 300 | 50 | 7 | 250 | 55 |
| 1,000 | 0 | | 25 | 5 | 200 | 28 |

What is claimed is:

1. A composition comprising 2–30% wt. of a block copolymer having at least two monoalkenylarene polymer blocks each having an average molecular weight between about 5,000 and 75,000 and at least one substantially completely hydrogenated polymer block of a conjugated diene, said block having an average molecular weight between about 25,000 and 250,000, and 70–98% wt. of an essentially non-aromatic hydrocarbon oil having a boiling point in excess of the softening point of the composition.

2. A composition according to claim 1 wherein the hydrogenated block copolymer has the configuration polystyrene-hydrogenated polybutadiene-polystyrene.

3. A composition according to claim 1 wherein the hydrogenated block copolymer has the configuration polystyrene-hydrogenated polyisoprene-polystyrene.

4. A composition according to claim 1 wherein the oil is a mineral white oil.

5. A composition according to claim 1 wherein the oil contains less than 10% by weight of aromatics by clay-gel analysis.

References Cited

UNITED STATES PATENTS

| | | | |
|---|---|---|---|
| 3,333,024 | 5/1967 | Haefele et al. | 260—880 B |
| 3,485,787 | 12/1969 | Haefele et al. | 260—33.6 AQ |
| 3,595,942 | 7/1971 | Wald et al. | 260—880 B |
| 3,676,387 | 7/1972 | Lindlof | 260—33.6 AQ |
| 3,756,977 | 9/1973 | Yoshimoto et al. | 260—33.6 AQ |
| 3,792,005 | 2/1974 | Harlan | 260—33.6 AQ |

MORRIS LIEBMAN, Primary Examiner

H. H. FLETCHER, Assistant Examiner

U.S. Cl. X.R.

260—880 B